United States Patent [19]

Rosen

[11] Patent Number: 5,510,960
[45] Date of Patent: Apr. 23, 1996

[54] CONNECTOR ASSEMBLY FOR A MOTOR CONTROL UNIT

[75] Inventor: Gary M. Rosen, Clemson, S.C.

[73] Assignee: Square D Company, Palatine, Ill.

[21] Appl. No.: 286,737

[22] Filed: Aug. 5, 1994

[51] Int. Cl.$^6$ ........................................... H01R 9/00
[52] U.S. Cl. ..................... 361/823; 361/624; 361/648; 439/43; 439/251; 439/801
[58] Field of Search ................... 174/68.2, 72 B; 361/611, 624, 648, 650, 725, 727, 822–827; 439/43, 251, 682, 687, 709, 801, 810–813, 857, 860, 883, 888

[56] References Cited

U.S. PATENT DOCUMENTS

| | | | |
|---|---|---|---|
| 1,480,899 | 1/1924 | French et al. | 439/251 |
| 2,701,870 | 2/1955 | Obszarny | 439/801 |
| 3,088,091 | 4/1963 | Linn | 339/192 |
| 3,478,299 | 11/1969 | Cinatl et al. | 339/64 |
| 3,778,748 | 12/1973 | Holman | 339/64 |
| 4,502,097 | 2/1985 | Takahashi | 361/826 |
| 4,781,627 | 11/1988 | Farag et al. | 439/687 |
| 4,789,344 | 12/1988 | Fritsch et al. | 439/43 |
| 4,789,919 | 12/1988 | Cox et al. | 361/339 |

*Primary Examiner*—Gregory D. Thompson
*Attorney, Agent, or Firm*—Larry I. Golden; Kareem M. Irfan; Wayne H. Stoppelmoor

[57] ABSTRACT

A motor control unit for use in an electrical enclosure is provided, the motor control unit includes a connector stab assembly of a molded plastic housing having a base portion, at least one jaw connector cover extending from one side of the base portion and a corresponding bar cover extending from the other side of the base portion opposite the jaw connector. The jaw connector cover includes a pair of opposing u-shaped sidewall members. A metal bar is provided having a first end extending through the base into the jaw connector cover and a second end extending through the bar cover. The second end of the metal bar is adapted for connection to a wire conductor. A pair of jaw fingers extend from the first end of the metal bar and are partially enclosed in the jaw connector cover and are adapted to secure to a vertical bus bar. A pair of spring members are secured to the first end of the metal bar and engage each one of the jaw fingers for biasing the jaw fingers toward each other.

14 Claims, 8 Drawing Sheets

CONNECTOR ASSEMBLY FOR A MOTOR CONTROL UNIT

FIELD OF THE INVENTION

This invention relates generally to motor control units for electrical equipment control centers and, more specifically, to improved connector assembly systems for use with such motor control units.

BACKGROUND OF THE INVENTION

Control units which are used to control the distribution of electric current to a plurality of electric loads, such as a number of motors, from a central location, are generally housed in compartmented structures called control centers. Such control centers are formed of a group of individual control center sections each of which includes a plurality of cells or compartments wherein the control units are installed. Each control center section houses a number of control units vertically stacked one on top of the other. To facilitate wiring and servicing, control centers are provided with main horizontal bus bars which extend across the upper portions of all of the individual control center sections and which are connected to deliver current from a supply to groups of individual vertical bus bars in each control center section. Electrical current is supplied to the control center via the horizontal bus bars and is distributed through the vertical bus bars that run the length of each control center section. The vertical bus bars in turn deliver the current to the control units within the individual control center sections through separable jaw-like connectors which make contact with the vertical bus bars.

Power cables which are coupled to the opposite end of the jaw-like connectors could rotate creating unsafe electrical spacings to the motor control unit enclosure. Elaborate features, such as double bolts, shouldered lugs or embossed connectors, could be added to the power bus connectors to provide anti-rotation, however these features would add significant cost and complexity to the assembly. Therefore, there is a need to provide a device which is simple while preventing the wire cable from rotating.

SUMMARY OF THE INVENTION

It is a general object of the present invention to provide an assembly which connects a motor control unit to vertical bus bars in an enclosure.

It is a more specific object of the present invention to provide an anti-rotation member for preventing a wire conductor from rotating in a motor control unit.

In accordance with a preferred embodiment of the present invention a motor control unit for use in an electrical enclosure is provided, the motor control unit includes a connector stab assembly comprising a molded plastic housing having a base portion, at least one jaw connector cover extending from one side of the base portion and a corresponding bar cover extending from the other side of the base portion opposite the jaw connector. The jaw connector cover includes a pair of opposing u-shaped sidewall members. A metal bar is provided having a first end extending through the base into the jaw connector cover and a second end extending through the bar cover. The second end of the metal bar is adapted for connection to a wire conductor. A pair of jaw fingers secured to and extend from the first end of the metal bar and are partially enclosed in the jaw connector cover and are adapted to secure to a vertical bus bar. A pair of spring members are secured to and extend from the first end of the metal bar and engage each one of the jaw fingers for biasing the jaw fingers toward each other.

In accordance with another aspect of the present invention a connector stab assembly is provided for connecting a motor control unit to a vertical bus bar, the connector stab assembly includes a molded plastic housing, a metal bar extending through the plastic housing, and a connector assembly disposed on a first end of the metal bar for making electrical connection to the vertical bus bar. An anti-rotation means is disposed on a second end of the metal bar for preventing a wire conductor being secured to the second end of the metal bar from rotating.

In accordance with yet another aspect of the present invention an anti-rotation clip for a motor control unit is provided for preventing a wire conductor having a ring terminal attached thereto from rotating around a bolt which secures the ring terminal and said anti-rotation clip to a metal bar, the bolt extends through an aperture in the ring terminal and an aperture in the metal bar and is secured in place with a nut. The anti-rotation clip includes a planar base portion having four corners thereon and an aperture therein which is in general alignment with the aperture in the metal bar thereby allowing the bolt to pass therethrough. The base portion has a leg member extending outwardly from each one of its four corners and over the metal bar. The leg members are adapted to receive the ring terminal therebetween thereby preventing the ring terminal from rotating.

BRIEF DESCRIPTION OF THE DRAWINGS

Other objects and advantages of the invention will be apparent from the following detailed description and the accompanying drawings in which.

DETAILED DESCRIPTION OF THE PREFERRED EMBODIMENTS

For a better understanding of the present invention together with other and further advantages, and capabilities thereof, reference is made to the following disclosure and appended claims in connection with the above-described drawings.

Figure 1:
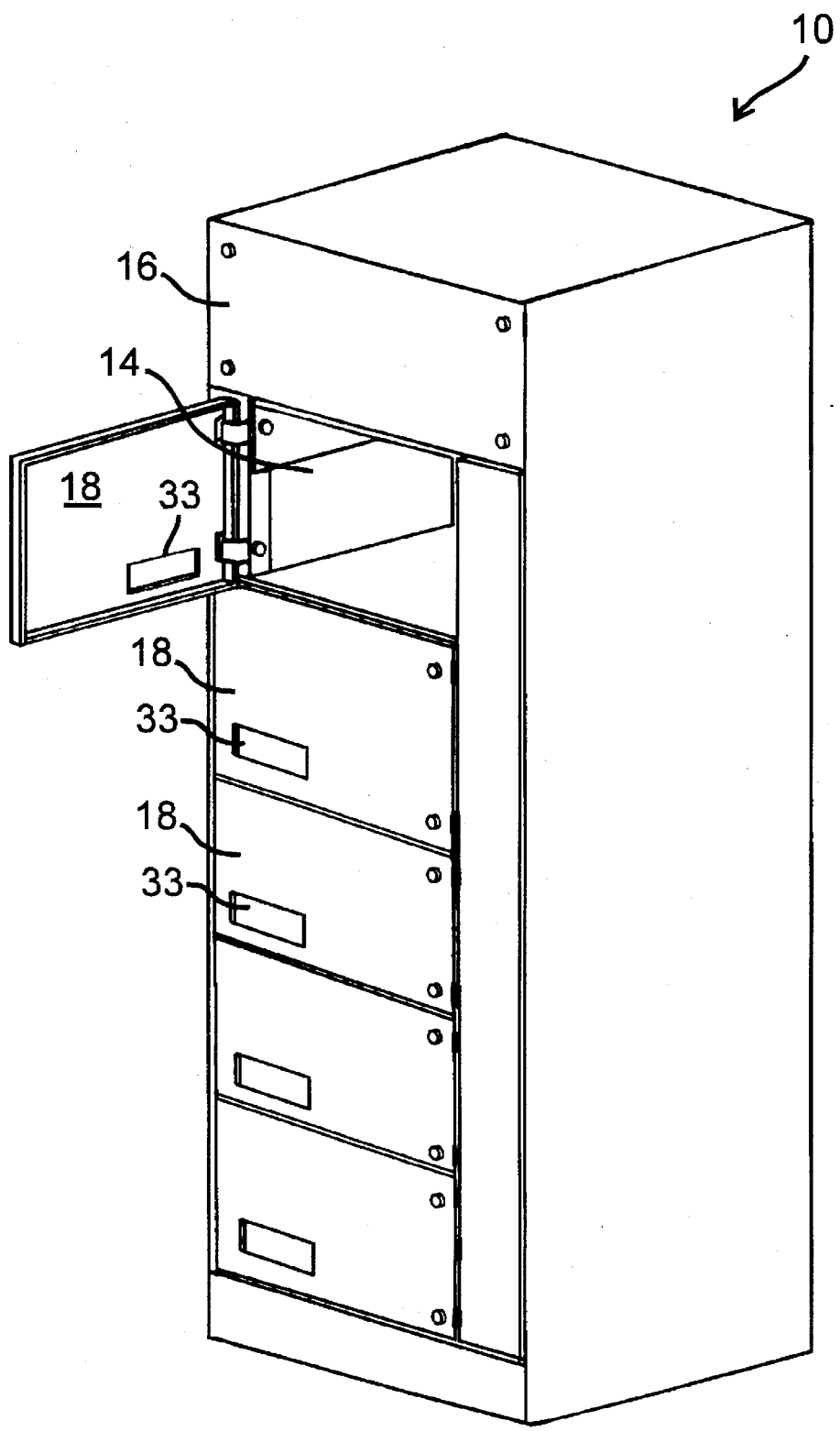
FIG. 1 is a representation isometric view of a control center section.

By way of background information, referring initially to FIG. 1 of the drawings, there is illustrated a motor control center section 10 which may, for example, be of the type described in U.S. Pat. No. 3,482,143, issued Dec. 11, 1967, entitled "Unit Mounting Pan for an Electrical Enclosure Structure" or U.S. Pat. No. 3,495,135, issued Dec. 11, 1967, entitled "Electrical Control Center Structure Having Symmetrical Parts"; both patents are assigned to Square D Company and the disclosures therein are incorporated herein by reference.

Each motor control section 10 contains individual control units 12 (FIG. 2) positioned inside a control unit compartment 14 which are stacked one on top of the other. Each motor control unit 12 is hung from a unit shelf (not shown) which is mounted in each compartment 14. The unit shelf may, for example, be of the type described in U.S. Pat. No. 4,787,011, issued Nov. 22, 1988, entitled "Control Center Unit Shelf Assembly", assigned to Square D Company and the disclosure therein is incorporated herein by reference. Several motor control sections 10 are generally placed side by side in an industrial location to control the electrical equipment of a plant. A horizontal bus bar compartment cover 16, at the top of the control center 10 section, covers the area which houses horizontal bus bars (not shown) and their connection to vertical bus bars (not shown). A supply source provides electrical power through the horizontal bus bars and vertical bus bars to the individual control units 12. The control units 12 are enclosed in the control compartments 14 with a door 18.

Figure 2:
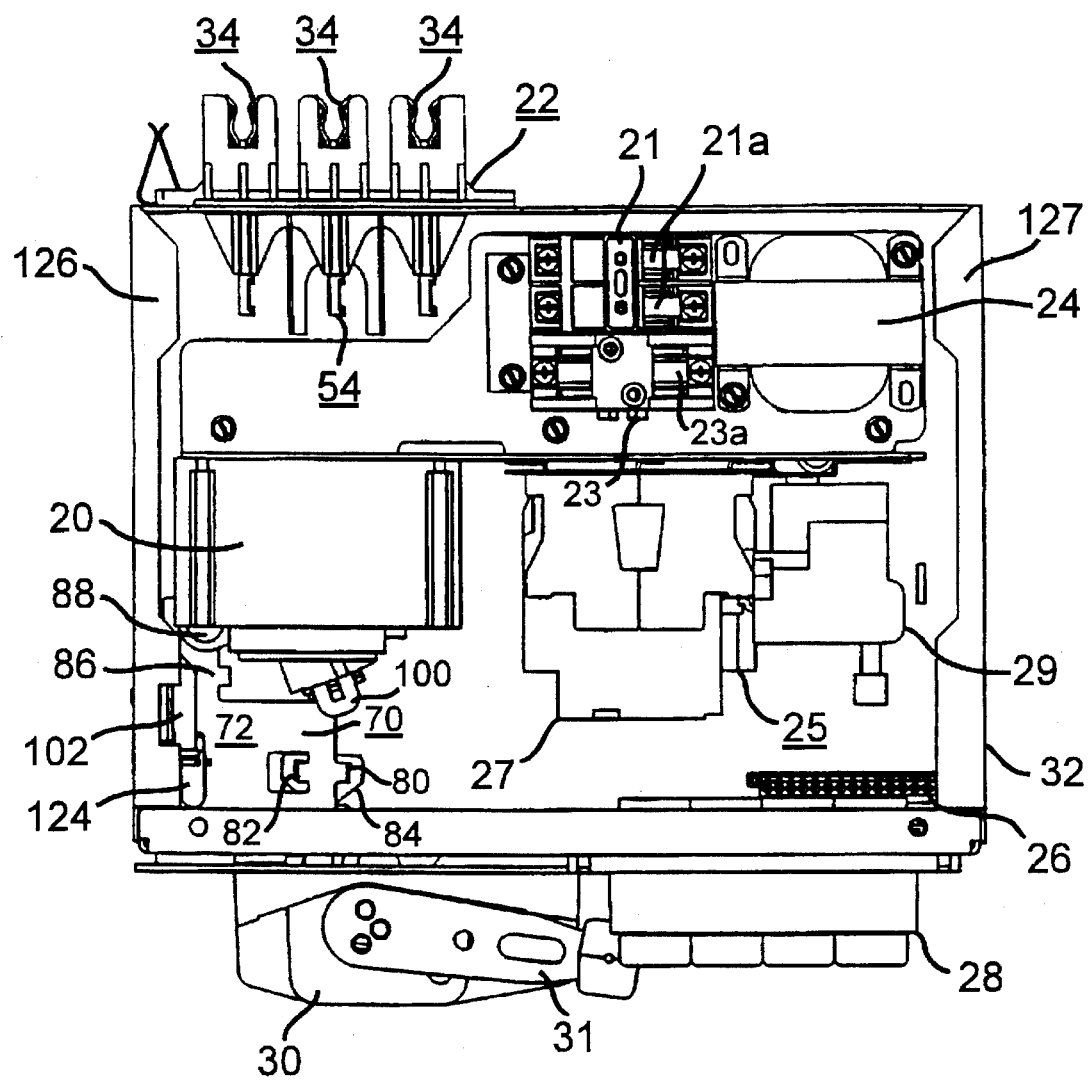
FIG. 2 is a top view of a motor control unit.

Now referring to FIG. 2, the control unit 12 is shown containing a circuit breaker 20, a connector stab assembly 22, a two pole primary fuse block 21, a single pole secondary fuse block 23, a transformer 24, a motor starter assembly 25, a terminal block assembly 26, a control panel assembly 28, and a handle assembly 30 having an operating handle 31. The above-mentioned components are housed in or secured to an enclosure 32 which has a base portion 89 (FIG. 6) and four sidewall portions. The handle assembly 30 extends outwardly through an opening 33 (FIG. 1) in the door 18.

The two pole fuse block 21 and single pole fuse block 23 are available as cat. no. BC6032P and cat. no. BC6031P, respectively, from Cooper Industries Inc., Bussmann Division of St. Louis, Mo. The fuse blocks contain traditional fuses 21a, 23a which are sized appropriately for their specific application. The transformer 24 is a traditional control power transformer such as Class 9070, type EL available from Square D Company of Palatine, Ill. The motor starter assembly 25 is comprised of a contactor 27 and an overload relay 29 and may be obtained separately or as a complete assembly such as catalog no. 85365CO3Z025 from Square D Company of Palatine, Illinois. The circuit breaker 20 can be any traditional 3 phase circuit breaker such as cat. no. GJL36030M04 from Square D Company of Palatine, Ill.

The terminal block assembly 26 is comprised of a plug and base portion which are available as cat. nos. MSTB2.5/15-ST-5.08 and MBSTBU2.5/15-GB-5.08, respectively, from Phoenix Contact of Harrisburg, Pa. Control wires for controlling the control unit 12 are coupled to the terminal block 26. The control panel assembly 28 is comprised of 22 millimeter pilot lights which are available as cat. no. XB2B from Square D Company of Palatine, Ill.

Power is distributed to the motor control unit 12 from the vertical bus bars through a plurality of jaw assemblies 34, disposed in the connector stab assembly 22, which make electrical contact with the vertical bus bars. The jaw assemblies 34 are adapted to be connected to the vertical bus bars within the control section 10.

Figure 3:
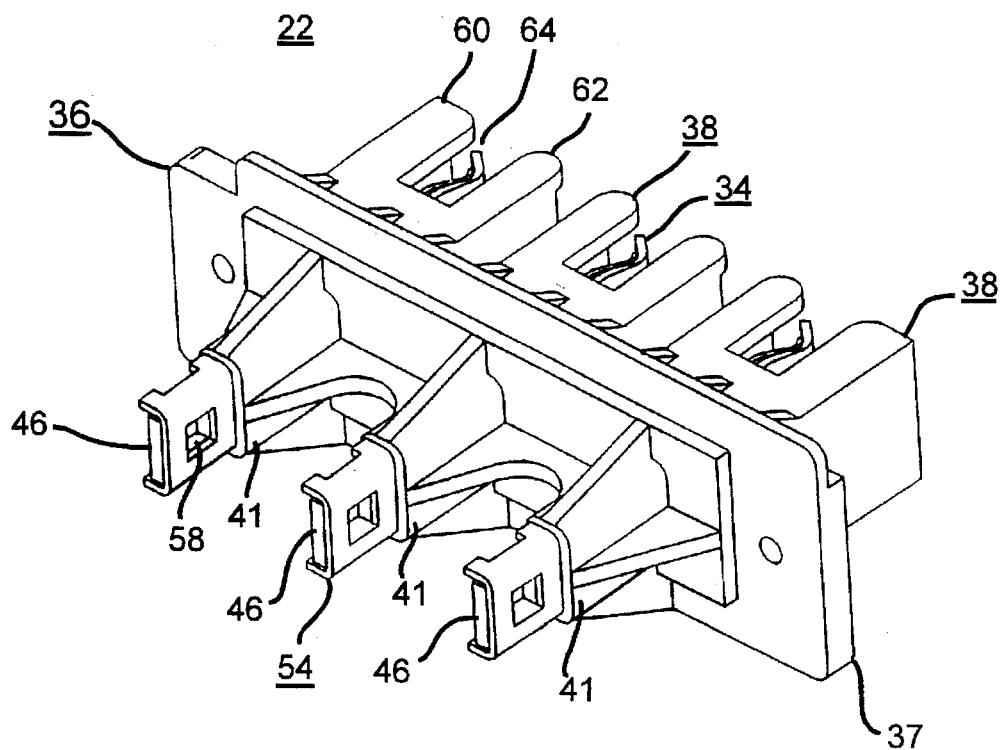
FIG. 3 is an isometric view of the connector stab assembly shown in FIG. 2.
Figure 4:
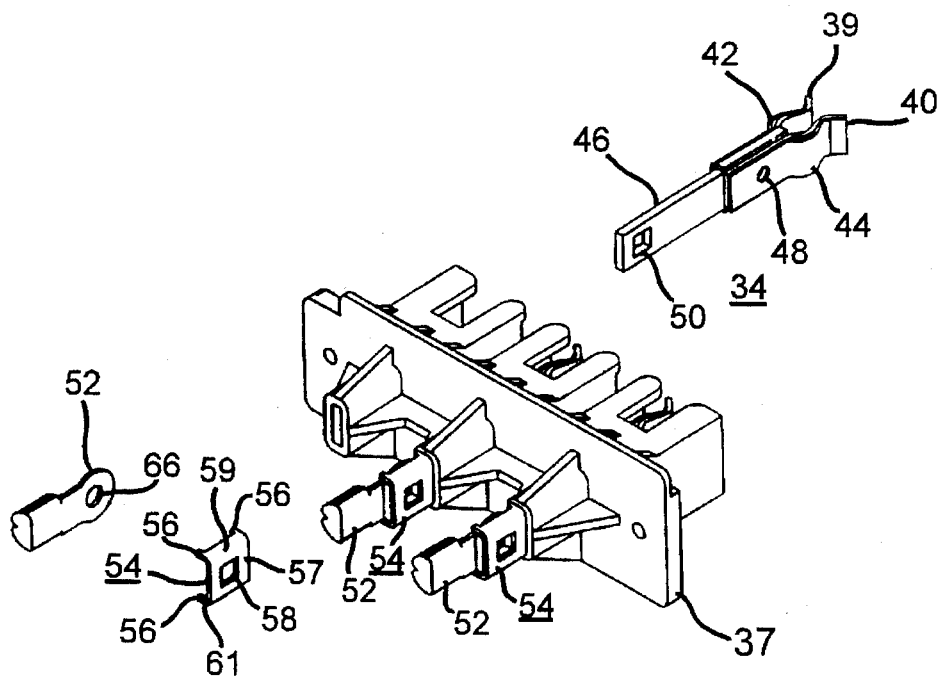
FIG. 4 is an isometric view of the connector stab assembly shown in FIG. 2 with a jaw assembly removed from the housing.
Figure 5:
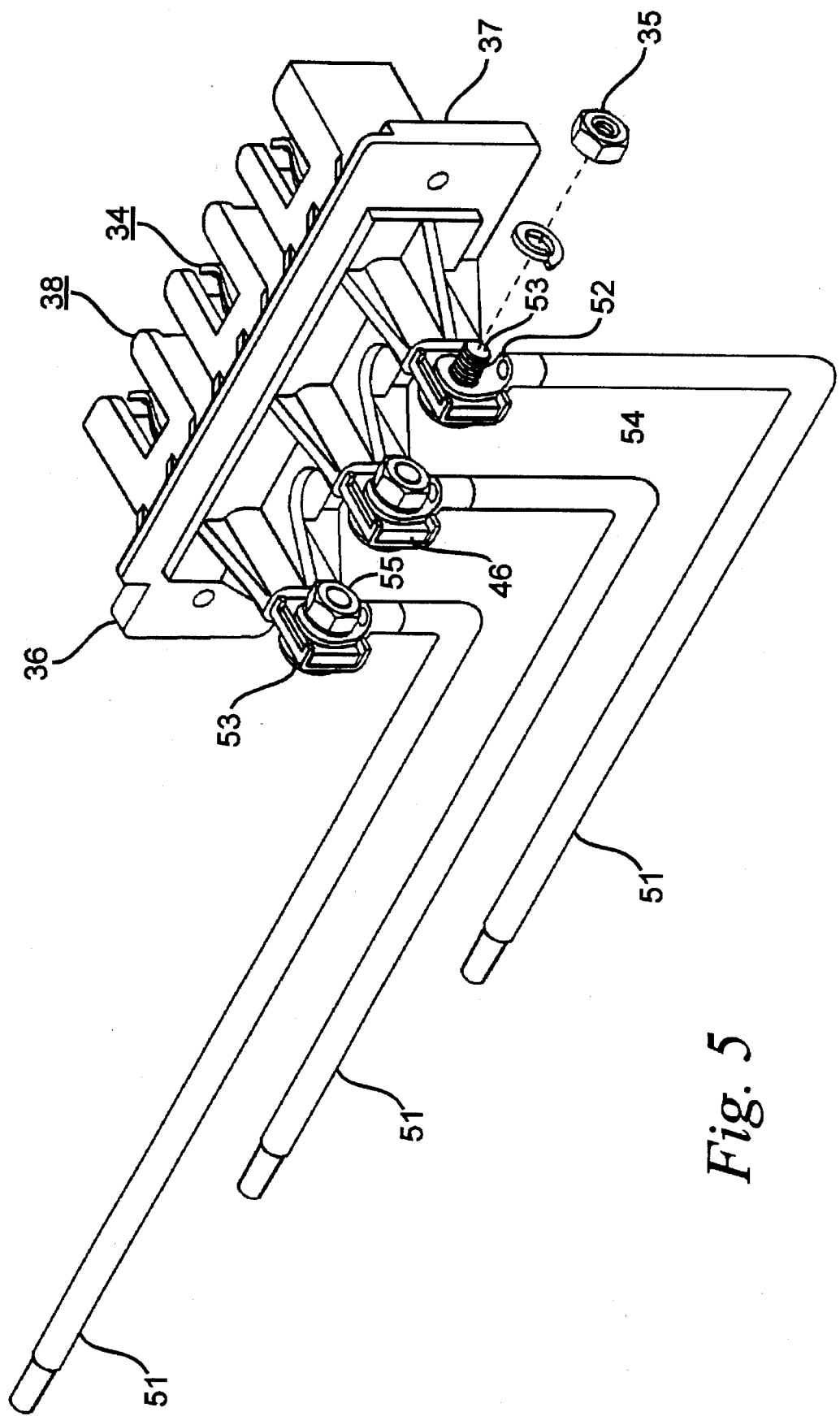
FIG. 5 is an isometric view of the connector stab assembly shown in FIG. 2 with wire conductors secured to metal bars of the jaw assemblies utilizing anti-rotation members.

The connector assembly 22 is disposed in an opening 43 (FIG. 6) in a sidewall 45 which is secured to the enclosure 32. FIGS. 3–5 show the connector stab assembly 22 having a one piece molded plastic housing 36 with the jaw assemblies 34 extending through the housing 36 and an anti-rotation clip 54. The housing 36 has a plurality of jaw connector covers 38 extending from one side of a base portion 37 and a plurality of bar covers 41 extending from the opposite side of the base portion 37 with each bar cover 41 corresponding to one of the jaw connector covers 38. Each jaw connector cover 38 include a pair of opposing u-shaped sidewalls 60, 62 which partially enclose one of the connecting jaw assemblies 34 which protrudes through an opening in the base portion 37 of the housing 36. An opening 64 is provided between the opposing sidewalls 60, 62 for positioning the vertical bus bars therebetween thereby allowing the jaw assemblies to slide onto the vertical bus bars.

Each of the jaw assemblies 34 include a metal bar 46 extending through the housing 36 and having first and second jaw fingers 39, 40 secured thereto and extending from one end thereof for making electrical contact with the vertical bars (not shown). Corresponding first and second spring members 42, 44 are disposed on their corresponding jaw fingers 39, 40, respectively, for biasing the jaw fingers towards each other and onto the vertical bus bar thereby assuring a good electrical connection. The jaw fingers and spring members are secured to one end of the metal bar 46 utilizing a bolt (not shown) which passes through an aperture 48 and secured in place with a nut (not shown). The jaw fingers and spring members may be secured to the metal bar 46 with a rivet, by welding, or any other method that will provide a secure electrical connection. The other end of the metal bar 46 protrudes through its respective bar cover 41 on the other side of the base 37 and contains a square aperture 50 for receiving a traditional square neck bolt 53 having a square neck which passes into the square aperture 50.

A wire conductor 51 (FIG. 5) having a ring terminal 52 secured thereto is electrically coupled to the metal bar 46 with the square neck bolt 53 and a nut 55. The anti-rotation clip 54 is positioned between the head of the square neck bolt 53 and the metal bar 46 for preventing the wire conductor 51 from rotating. The anti-rotation clip 54 is generally table-shaped having a planar base portion 57 (FIG. 4) and four legs 56 (the fourth leg is not shown) extending outwardly from the corners of two opposing side members 59, 61 which extend outwardly from the base portion 57. The legs 56 extend over the metal bar 46. The base portion 57 of the anti-rotation clip 54 has a square aperture 58 therein which aligns with the square aperture 50 in the metal bar 46 for allowing the square neck bolt 53 to pass through both square apertures. The ring terminal 52 is nested within the legs 56 while the round portion of the square neck bolt 53 extends through an aperture 66 in the ring terminal 52 and the square neck portion engages the aligned square apertures 50, 58. The nut 55 is then secured to the bolt 53 thereby securing the ring terminal 52 to the metal bar 46. This engagement with the ring terminal 52 nested within the legs 56 of the anti-rotation clip 54 establishes a limited angular displacement thereby preventing the wire terminal and wire conductor from rotating. By positioning the anti-rotation clip 54 so that the legs 56 overlap both the metal bar 46 and the ring terminal 52 thereby utilizing the legs 56 for preventing the ring terminal and the anti-rotation clip 54 from rotating about the bolt 53, the anti-rotation clip 54 will function effectively with a round aperture or any other shaped aperture instead of the square aperture 50 provided the aperture allows the bolt to pass therethrough.

Again referring to FIG. 2, electrical current is supplied to the control unit 12 via the horizontal bus bars (not shown)

and is distributed through the vertical bus bars (not shown). The vertical bus bars in turn deliver the current to the control unit 12 through the separable jaw assemblies 34 which make contact with the vertical bus bars. When the operating handle 31 is in the ON position which turns ON the circuit breaker 20, the current then flows through the circuit breaker 20 and to the other components of the control unit 12 through a power circuit and a control circuit. For example, current in the power circuit is directed to the motor starter 25 and then to motors (not shown) which are being control by the control unit 12. In the control circuit the current flows from the circuit breaker 20 to the primary fuse assembly 21, through the fuses 21a and through the transformer 24 to the secondary fuse assembly 23 and then through the secondary fuse 23a to the terminal block assembly 26 where current is selectively routed to the contactor 27, the control panel assembly 28 and other control components, such as a push-to-start button (not shown).

Figure 6:
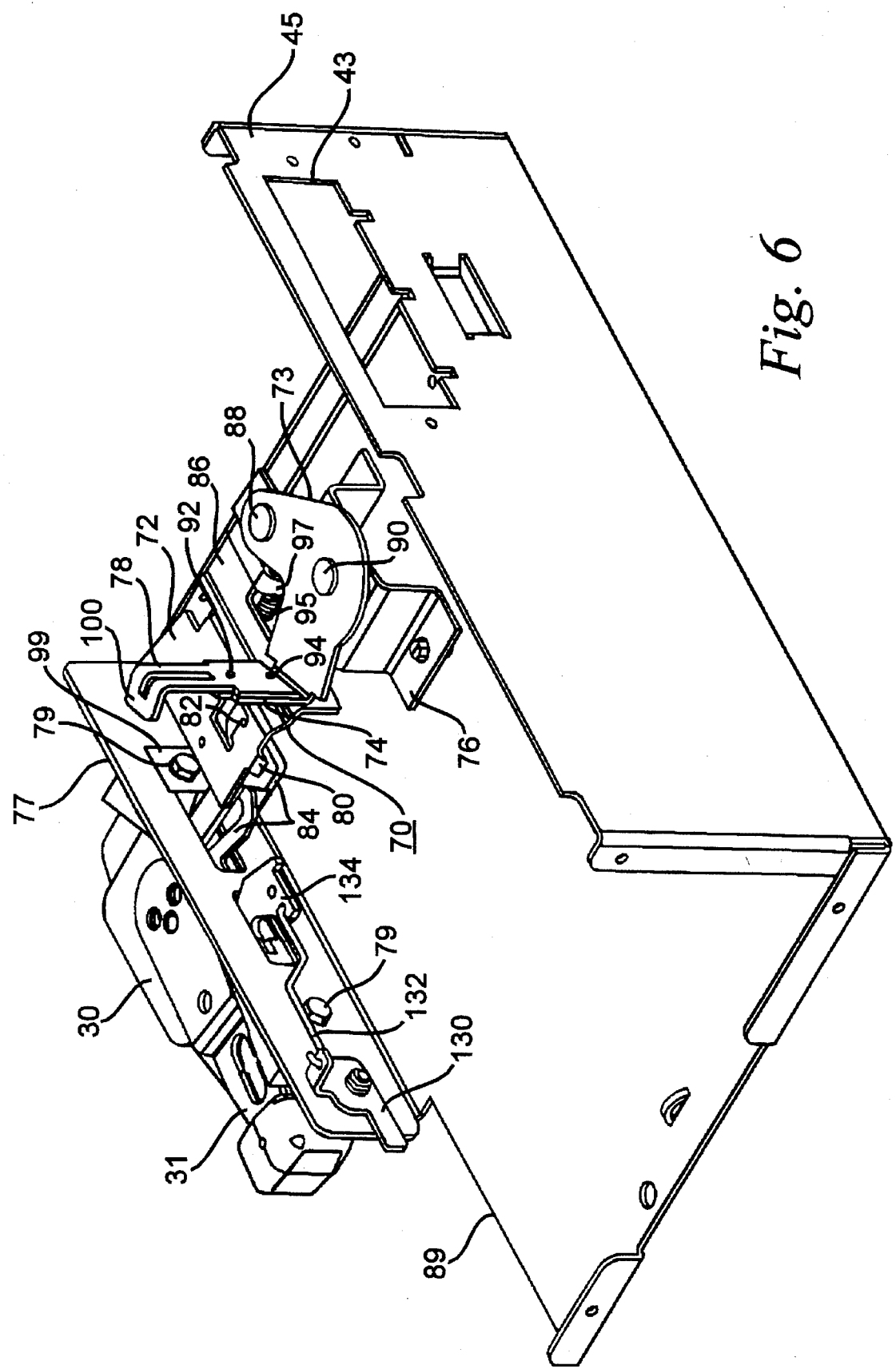
FIG. 6 is an isometric view of the control unit showing only the handle assembly and the circuit breaker linkage assembly.
Figure 7:
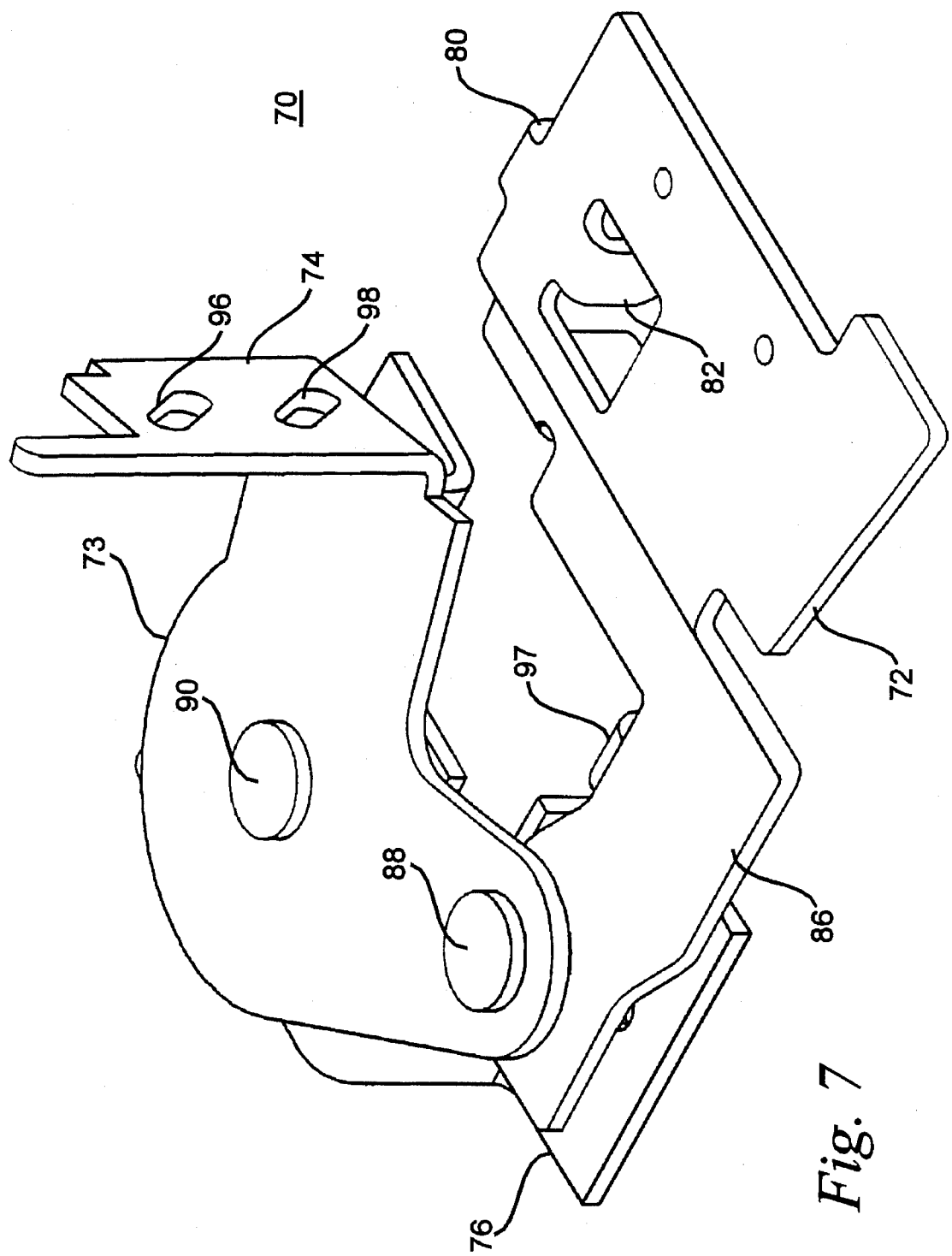
FIG. 7 is an isometric view of the circuit breaker linkage assembly without the adjustment plate secured thereto.

Referring to FIGS. 2, 6 and 7 the circuit breaker linkage assembly 70 is shown which translates rotary motion of the operating handle 31 into rotary motion which actuates the circuit breaker 20. For example, when the operating handle 31 is moved to the ON position the circuit breaker is moved to the ON position thereby allowing current to pass through the circuit breaker. The linkage assembly 70 consists of a first link 72, a second link 73 having an upwardly extending bail arm 74, a u-shaped mechanism bracket 76 and a L-shaped adjustment plate 78. The handle assembly 30 is secured to one of the enclosure sidewalls 77 with a pair of bolts 79.

The first link 72 has a pair of downwardly extending tabs 80, 82 which are disposed in corresponding slots in a handle link 84. The handle link 84 is secured to the operating handle 31 thereby transferring the rotary motion of the operating handle 31 to linear motion of the first link 72. The first link 72 has a neck portion 86 which is secured to the second link 73 with a rivet 88. A rivet 90 rotatably secures the second link 73 to the mechanism bracket 76 which is secured to the base 89 of the enclosure. The adjustment plate 78 is secured to the bail arm 74 with screws 92, 94 which pass through a pair of diagonally positioned slots 96, 98 in the bail arm 74 and into tapped holes in the adjustment plate 78. The adjustment plate 78 has an outwardly extending finger portion 100 which engages a circuit breaker handle (not shown) to actuate the handle thereby turning the circuit breaker ON and OFF. The diagonal slots 96, 98 provide an adjustable interface between the circuit breaker handle and the adjustment plate 78. The second link 73 being supported by the mechanism bracket 76 converts linear motion of the first link 72 into a rotary motion which is utilized by the bail arm 74 and the adjustment plate 78 to actuate the circuit breaker 20.

An extension spring 95 is utilized to move the operating handle 31 into a position between the ON and OFF positions to indicate that the circuit breaker 20 has tripped. The extension spring 95 is secured at one end to a downwardly positioned ear tab 97 on the neck portion 86 and the other end of the spring 95 is secured to a hook (not shown) disposed on a bracket 99 which is secured to the sidewall portion 77 with the bolt 79.

Figure 8:
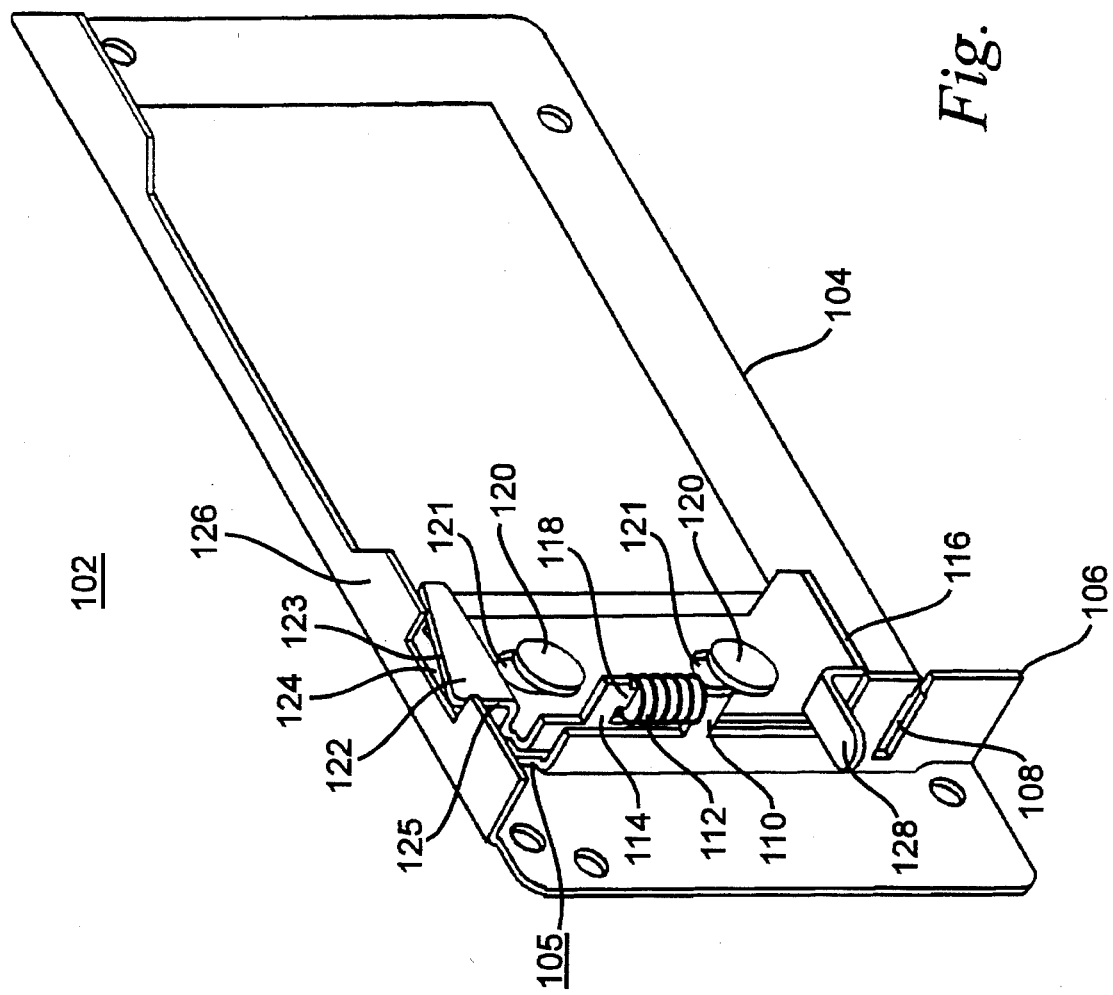
FIG. 8 is an isometric view of the interlock assembly.
Figure 9:
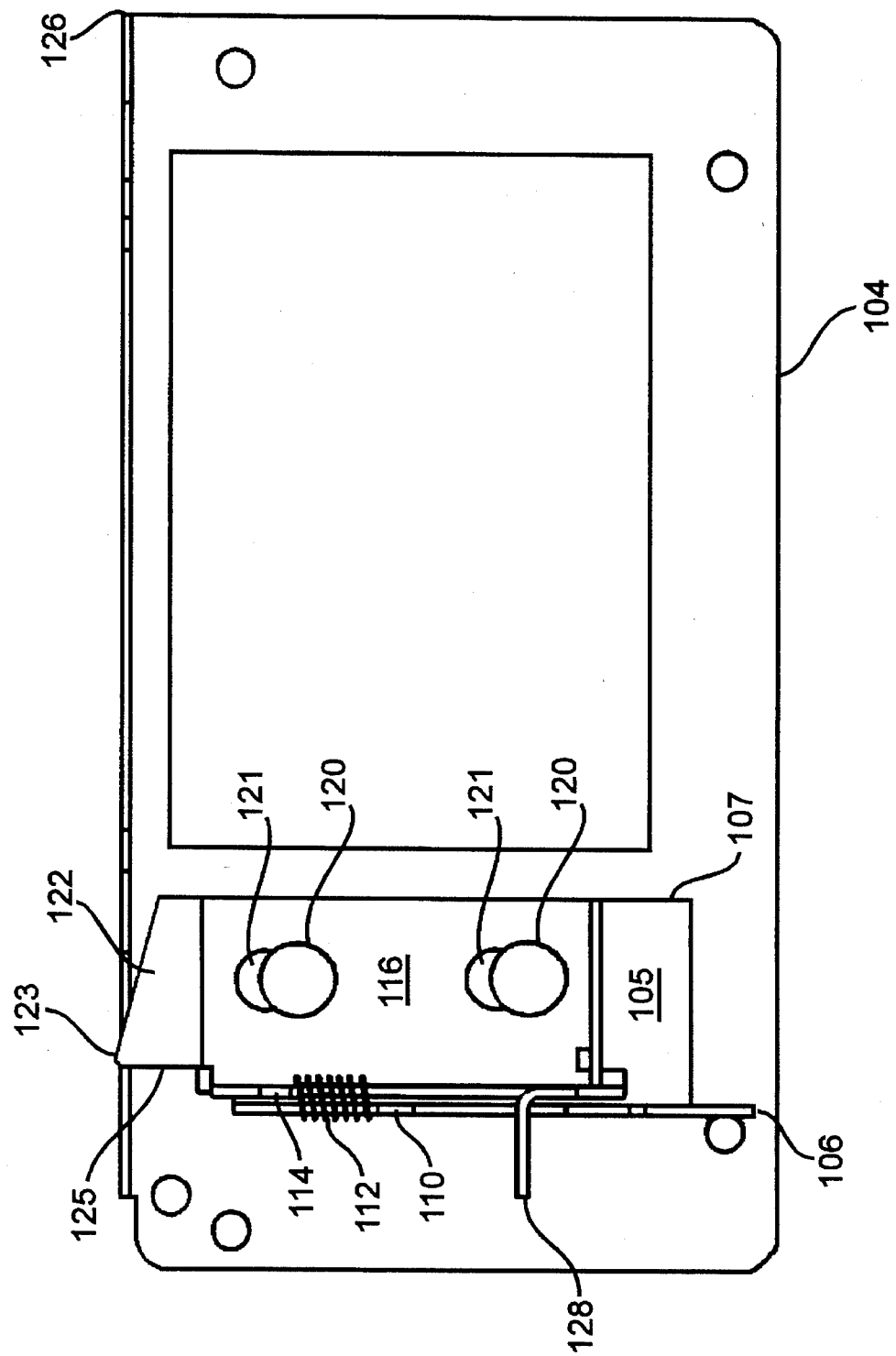
FIG. 9 is a side view of the interlock assembly shown in FIG. 8.

Referring now to FIGS. 2, 8 and 9, an interlock assembly 102 is shown which prevents the insertion of the control unit 12 into the unit compartment 14 (FIG. 1) when the operating handle 31 is in the ON position. Additionally, the interlock assembly 102 prevents the control unit 12 from being removed from electrical contact with the vertical bus bars when the operating handle 31 is in the ON position.

The interlock assembly 102 includes a L-shaped bracket 105 having an outwardly extending leg 106 and a base portion 107 (FIG. 9) secured to a sidewall portion 104 which is secured to the base 89 (FIG. 6) of the enclosure. The leg 106 has a slot 108 (FIG. 8) therein for receiving the first link 72 of the circuit breaker linkage assembly 70. A first spring retaining extension 110 is formed on the leg 106 for retaining one end of a compression spring 112. The other end of the spring 112 is retained by a second spring retaining extension 114 disposed on a movable slide member 116. The two spring retaining extensions 110, 114 have a spring retaining tab 118 for retaining the compression spring 112 therebetween.

The bracket 105 and the movable slide member 116 are secured to the sidewall portion 104 with a pair of rivets 120. The slide member 116 has a pair of slotted apertures 121 therein so that the movable slide member 116 may move in a vertical direction. The slots 121 are sized large enough so that the pins (not shown) of the rivets 120 pass therethrough and small enough so that the heads of the rivets do not pass through the slots 121. The spring 112 biases the slide member 116 upwardly so that the slide member 116 is normally in the up position. The slide member 116 includes a ramp-shaped tab 122 disposed thereon extending upwardly through a notch 124 in a flange 126 formed on the sidewall portion 104. The ramp-shaped tab has an angled ramp edge 123 and a vertical tab edge 125. A finger tab 128 is formed on the slide member 116 and extends through an opening in the leg 106.

Referring to FIGS. 1, 2, 7 and 8, the operation of the interlock assembly will now be discussed. To insert the control unit 12 into the compartment 14 of the control section 10 the operating handle 31 must be in the OFF position. The flanges 126, 127 of the control unit 12 are slid onto traditional shelf flanges (not shown) on the unit shelf (not shown) in the compartment 14. The shelf flanges engage the ramp edge 123 of the ramp-shaped flange 122 thereby moving the slide member 116 downward. If the operating handle 31 is in the ON position the first link 72 of the circuit breaker linkage assembly 70 will extend through the slot 108 and therefore be in the path of the movable slide member 116 thereby not allowing the movable slide member 116 and the ramp-shaped tab 122 to move downward thereby not allowing the control unit 12 to move along the shelf flanges into the compartment. If the operating handle 31 is in the OFF position the first link 72 will not block the slide member 116 from moving downwardly thereby allowing the shelf flange to force the ramp-shaped tab 122 downwardly and out of the way. The control unit 12 is moved into the compartment 14 until the jaw assemblies are totally engaged with the vertical bus bars. When the control unit 12 is completely installed in the compartment 14 the ramp-shaped tab 122 aligns with a notch (not shown) in the shelf flange and allowing the slide member 116 to automatically return to its normal position, due to the bias spring 112 forcing the slide member 116 upwardly thereby automatically engaging the interlock mechanism 102. When the interlock mechanism 102 is engaged, the control unit 12 may not be removed from the compartment 14 because the ramp-shaped tab 122 is in a normally upward position into the notch in the shelf thereby positioning the tab edge 125 behind an edge of the notch and preventing the control unit 12 from being removed from the compartment 14. When the handle is in the ON position the interlock mechanism 102 can not be defeated because the first link 72 extends through the slot 108 and blocks the slide member 116 from moving downward thereby preventing the ramp-shaped tab 122 from moving downward and releasing its hold in the notch of the shelf flange. When the operating handle 31 is in the OFF position, the first link 72 is removed from the path of the slide member 116 thereby allowing a user to push down on the finger tab 128 and removing the ramp-shaped tab 122 from the notch in the shelf flange which allows the control unit 12 to be removed from the compartment 14.

As the control unit 12 is being inserted into the compartment 14 the interlock assembly 102 performs the additional task of not allowing the circuit breaker 20 to be turned ON until the control unit 12 is fully inserted into the compartment 14. If the control unit 12 is not fully engaged in the compartment 14 the ramp-shaped tab 122 of the slide member 116 will not align with the notch in the shelf flange and will not move upward thereby causing the slide member 116 to be in a downward position thereby blocking the movement of the first link 72 therefore preventing the circuit breaker linkage assembly 70 from turning ON the circuit breaker.

The present interlock assembly 102 is an improvement over the prior art because it engages automatically. Interlock assemblies in the prior art required them to be manually engaged by the user. The interlock assembly was described being integrated with a circuit breaker, however, this interlock assembly could be integrated with an electrical disconnect switch such as the one described in U.S. Pat. No. 4,302,643 entitled "Fusible Switch" which is assigned to the same assignee as the present application, and is hereby incorporated by reference.

FIG. 6 shows a traditional door interlock assembly comprising a flap tab 130, a link 132 and a rotatable handle assembly tab 134 which will not allow the cabinet compartment door 18 to be opened if the operating handle 31 is in the ON position. Additionally, the door interlock assembly will not allow the control unit 12 to be turned ON if the door 18 is open.

While there have been shown and described what are at present considered the preferred embodiments of the invention, it will be obvious to those skilled in the art that various changes and modifications may be made therein without departing from the scope of the invention as defined by the appended claims.

What is claimed is:

1. A connector stab assembly for a motor control unit, comprising:
   a molded plastic housing having a base portion, at least one jaw connector cover extending from one side of said base portion and a corresponding bar cover extending from the other side of said base portion opposite said jaw connector, said jaw connector cover includes a pair of opposing u-shaped sidewall members;
   a metal bar having a first end extending through said base portion into said jaw connector cover and a second end extending through said bar cover, said second end is adapted for connection to a wire conductor;
   first and second jaw fingers secured to and extending from said first end of said metal bar, said first and second jaw fingers are partially enclosed in said jaw connector cover and are adapted to secure to a vertical bus bar; and
   first and second spring members secured to and extending from said first end of said metal bar, said first and second spring members engaging said first and second jaw fingers for biasing said first and second jaw fingers towards each other.

2. A connector stab assembly according to claim 1, wherein said second end of said metal bar includes an aperture for receiving a bolt therethrough.

3. A connector stab assembly according to claim 2, further includes an anti-rotation member for preventing the wire conductor from rotating.

4. A connector stab assembly according to claim 3, whereby said anti-rotation member is generally table-shaped having a planar base portion and four legs extending outwardly from ends of two opposing side members which extend outwardly from the base, said base portion includes an aperture therein which is in alignment with said aperture in said metal bar receiving said bolt, said legs being adapted to overlap said metal bar and accept a terminal connected to the wire conductor.

5. A connector stab assembly according to claim 4, wherein said aperture in said metal bar and said aperture in said anti-rotation member are generally square shaped for receiving the neck of said bolt which is generally square shaped.

6. A connector stab assembly according to claim 1, wherein said pair of opposing u-shaped sidewall members are spaced apart to provide for an opening for accepting the vertical bus bar.

7. A connector stab assembly for connecting a motor control unit to a vertical bus bar, comprising:
   a molded plastic housing which includes a base portion, a plurality of jaw connector covers extending from one; side of said base portion and a plurality of bar covers extending from the other side of said base portion opposite a corresponding one of said plurality of jaw connector covers;
   a metal bar extending through said plastic housing;
   a connector assembly disposed on a first end of said metal bar for making electrical connection to the vertical bus bar; and
   anti-rotation means disposed on a second end of said metal bar for preventing a wire conductor being secured to said second end of said metal bar from rotating.

8. A connector stab assembly according to claim 7, whereby said anti-rotation means includes a generally table-shaped member have a generally square shaped planar base portion having a leg extending outwardly from each one of its corners, said base portion has an aperture therein adapted to receive a bolt having a generally square shaped neck, said legs are adapted to receive and thereby prevent a terminal secured to the wire conductor from rotating.

9. A connector stab assembly according to claim 7, whereby each of said jaw connector covers include a pair of opposing u-shaped sidewall members.

10. A connector stab assembly according to claim 7, whereby said first end of said metal bar extends through said base into one of said plurality of jaw connector covers and said second end of said metal bar extends through the corresponding one of said plurality of bar covers, said second end is adapted for connection to a wire conductor.

11. A connector stab assembly according to claim 10, whereby said connector assembly includes first and second jaw fingers extending from said first end of said metal bar, said first and second jaw fingers are partially enclosed in one of said plurality of jaw connector covers and are adapted to secure to the vertical bus bar.

12. A connector stab assembly according to claim 11, whereby said connector assembly further having first and second spring members secured to said first end of said metal bar and engaging said first and second jaw fingers for biasing said first and second jaw fingers towards each other.

13. An anti-rotation clip for a motor control unit for preventing a wire conductor having a ring terminal attached thereto from rotating around a bolt which secures the ring terminal and said anti-rotation clip to a metal bar, the bolt extends through an aperture in the ring terminal and an aperture in the metal bar and is secured in place with a nut, said anti-rotation clip comprising a planar base portion having an aperture therein which is in general alignment with the aperture in the metal bar thereby allowing the bolt to pass therethrough and opposing side portions disposed on opposite sides of said base portion and overlapping the metal bar, said side portions having a pair of leg members extending outwardly therefrom, said leg members are adapted to receive the ring terminal therebetween thereby preventing the ring terminal from rotating.

14. An anti-rotation clip according to claim 13, wherein said aperture in said base portion is generally square shaped.

* * * * *